United States Patent
Akahori

(10) Patent No.: US 8,272,651 B2
(45) Date of Patent: Sep. 25, 2012

(54) TORSION BEAM TYPE SUSPENSION

(75) Inventor: Wataru Akahori, Hamamatsu (JP)

(73) Assignee: Suzuki Motor Corporation, Shizuoka-Ken (JP)

( * ) Notice: Subject to any disclaimer, the term of this patent is extended or adjusted under 35 U.S.C. 154(b) by 155 days.

(21) Appl. No.: 12/950,059

(22) Filed: Nov. 19, 2010

(65) Prior Publication Data

US 2011/0121532 A1    May 26, 2011

(30) Foreign Application Priority Data

Nov. 26, 2009   (JP) .................. 2009-268718

(51) Int. Cl.
*B60G 21/05*    (2006.01)

(52) U.S. Cl. .............................. 280/124.106

(58) Field of Classification Search .......... 280/124.106, 280/124.107, 124.128, 124.166, 124.109; 301/127; 267/188
See application file for complete search history.

(56) References Cited

U.S. PATENT DOCUMENTS

| 7,322,590 B2 * | 1/2008 | Kye ........................ 280/124.106 |
| 7,540,513 B2 * | 6/2009 | Reineck ................. 280/124.106 |

FOREIGN PATENT DOCUMENTS

| JP | 11180124 A | * | 7/1999 |
| JP | 2001039134 A | * | 2/2001 |
| JP | 2001-187526 | | 7/2001 |
| JP | 2002-166714 | | 6/2002 |
| JP | 2004-330928 | | 11/2004 |

* cited by examiner

*Primary Examiner* — Faye M. Fleming

(74) *Attorney, Agent, or Firm* — Alston & Bird LLP

(57) ABSTRACT

A torsion beam type suspension has no risk that a beam body will directly contact with a fuel tank, or that a frontward projecting portion of a stabilizer will contact with the fuel tank. In a torsion beam type suspension in which a pair of trailing arms are connected to the beam body to form an H-shaped torsion beam, and both ends of the stabilizer separate from the torsion beam are connected to the trailing arms, both-side parts of the stabilizer 7 extending along the beam body 2a are attached to a vehicle body 4, a portion between vehicle body attachment parts 9 of the stabilizer 7 is curved downward, and the curved part 10 is disposed at the rear of the fuel tank 11 and in front of the beam body 2a.

7 Claims, 2 Drawing Sheets

TORSION BEAM TYPE SUSPENSION

BACKGROUND OF THE INVENTION

1. Field of the Invention

The present invention relates to a torsion beam type suspension capable of effectively absorbing an impact load applied from the rear.

2. Description of Related Art

In a motor vehicle employing a torsion beam type suspension to suspend rear wheels, the beam body of a torsion beam is sometimes moved to the vehicle body front by an impact load applied from the vehicle body rear. At this time, the beam body may contact with a fuel tank disposed in front of the beam body. The beam body of the torsion beam has a high rigidity, and often has an edge portion or angular portion directed to the front. Therefore, it is preferable to prevent trouble due to the beam body of the torsion beam contacting directly with the fuel tank.

Conventionally, as countermeasures for preventing such trouble, a clearance between the beam body and the fuel tank has been increased, or a resin-made or rubber-made protector has been provided to prevent the beam body from contacting with the fuel tank. Also, in the case in which a beam body having an opening has been used, the opening of the beam body has been provided at the rear.

However, the increase in clearance between the beam body and the fuel tank is impossible for a small motor vehicle, although it is possible for a large motor vehicle. Also, the provision of the resin-made or rubber-made protector on the beam body leads to an increase in the number of parts and an increase in cost. Furthermore, in the case in which a beam body having the opening has been used, if the opening of the beam body is directed to the rear, the appearance is impaired because the opening can be seen from the rear, and also this opening arrangement is unsuitable when an impact load is applied from the rear.

On the other hand, for the torsion beam type suspension, a stabilizer is used to obtain a restoring force against right and left torsion of the vehicle body. Regarding this stabilizer, stabilizers having various structures have been used widely. Generally, the stabilizer has a structure such that it connects right and left trailing arms to each other at both end parts thereof, and a middle part thereof is supported on the vehicle body, and is often disposed so as to extend along the beam body.

Related art is disclosed in JP 2001-187526 A, JP 2002-166714 A, and JP 2004-330928 A.

Unfortunately, if the beam body is moved to the front by an impact load applied from the vehicle body rear, the stabilizer is also moved at the same time, and a frontward projecting portion of the stabilizer may contact the fuel tank, or the angular portion of the beam body may collide with the fuel tank.

SUMMARY OF THE INVENTION

The present invention has been made to solve the above problems, and accordingly an object thereof is to provide a torsion beam type suspension in which there is no fear that a beam body will directly contact with a fuel tank or a frontward projecting portion of a stabilizer will contact with the fuel tank.

To achieve the above object, the present invention provides a torsion beam type suspension in which a pair of trailing arms is connected to a beam body to form an H-shaped torsion beam, and both ends of a stabilizer separate from the torsion beam are connected to the trailing arms, wherein both-side parts of the stabilizer extending along the beam body are attached to a vehicle body, a portion between vehicle body attachment parts of the stabilizer is curved downward, and the curved part is disposed at the rear of a fuel tank and in front of the beam body. To reduce the influence on the spring constant and durability of stabilizer as far as possible, the inside portion between the vehicle body attachment parts is curved downward.

In the present invention, the vehicle body attachment parts of the stabilizer are disposed on the outside at the right and left of the center in the vehicle body width direction and on the inside of both end attachment positions of the stabilizer.

Also, in the present invention, bent parts bent downward are formed on the outside of the vehicle body attachment parts of the stabilizer.

Furthermore, in the present invention, the vehicle body attachment parts of the stabilizer are attached to a cross member of the vehicle body.

Furthermore, in the present invention, a member for suspending the fuel tank is provided between the fuel tank and the downward bent parts of the stabilizer.

Furthermore, in present invention, the member for suspending the fuel tank is a tank belt.

Furthermore, in the present invention, the member for suspending the fuel tank is a tank bracket and a bead part provided on the tank.

According to a first aspect of the invention, when the beam body is moved by an impact load, since the curved part of stabilizer is located between the beam body and the fuel tank, there is no fear that the beam body contacts directly with the fuel tank. At this time, only the side surface of the curved part of stabilizer contacts with the fuel tank, so that a cushioning effect for the fuel tank can be achieved.

According to a second aspect of the invention, since the vehicle body attachment parts of stabilizer are provided on the inside of both the end attachment positions of stabilizer, the curved part of stabilizer provided between the vehicle body attachment parts of stabilizer can be arranged in the central portion of the beam body.

According to a third aspect of the invention, since the curved parts curved downward are formed on the outside of the vehicle body attachment parts of stabilizer, there is no fear that the beam body contacts directly with the fuel tank because the bent parts, which are bent downward, of the stabilizer are located between the beam body and the fuel tank.

According to a fourth aspect of the invention, since the vehicle body attachment parts of a stabilizer are attached to the cross member of a vehicle body, even when the vehicle body rear part is deformed, the vehicle body attachment parts of a stabilizer moves less, and the curved part of stabilizer can be reliably arranged in the central portion of the beam body.

According to a fifth aspect of the invention, since the member for suspending the fuel tank is provided between the fuel tank and the downward bent parts of stabilizer, there is no fear that the member for suspending the fuel tank will directly contact with the beam body.

According to a sixth aspect of the invention, since the member for suspending the fuel tank does not contact directly with the beam body, the tank belt can be used as the member for suspending the fuel tank. Therefore, in the case in which a resin-made tank is used as the fuel tank, the tank belt can be used.

According to a seventh aspect of the invention, in the case in which an iron-made fuel tank is used, as the member for suspending the fuel tank, the tank bracket and the bead part provided on the tank can be used to suspend the fuel tank.

DETAILED DESCRIPTION OF PREFERRED EMBODIMENTS

An embodiment of the present invention will now be described in detail with reference to the accompanying drawings.

Figure 1:
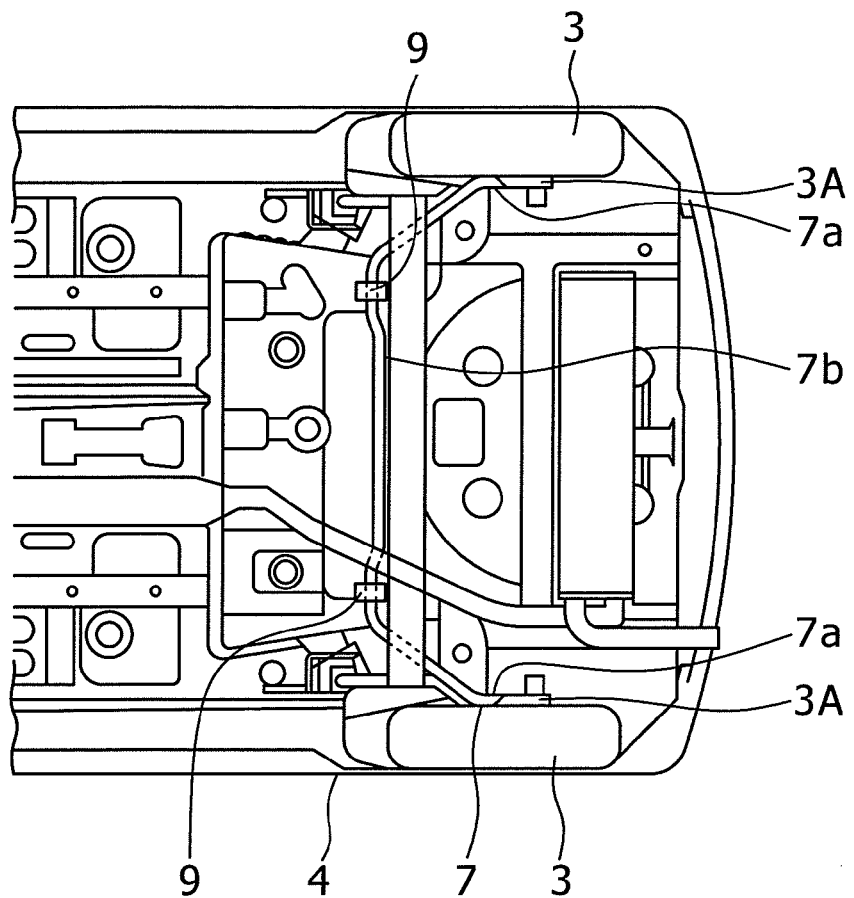
FIG. 1 is a bottom view of a torsion beam and a stabilizer in accordance with one embodiment of the present invention, viewed from the vehicle body lower surface side.
Figure 2:
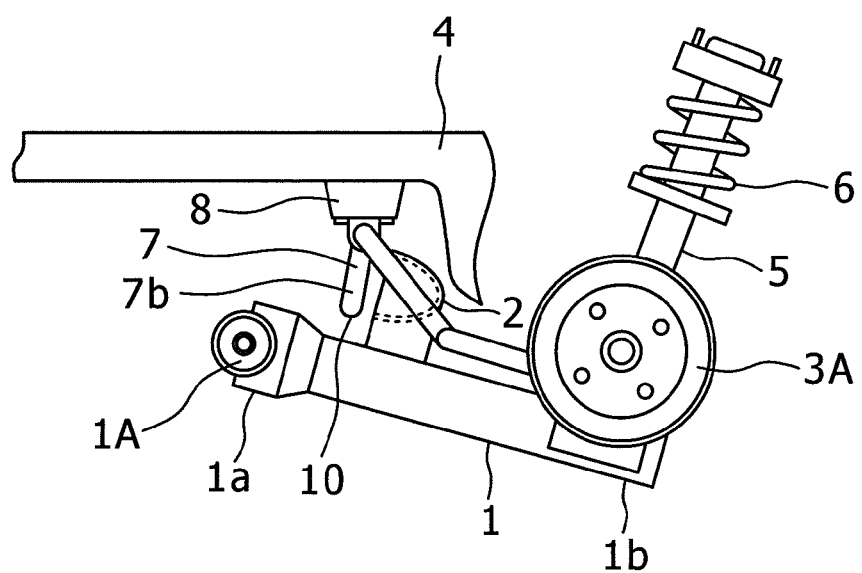
FIG. 2 is a side view of a torsion beam and a stabilizer in accordance with one embodiment of the present invention, viewed from the vehicle body side surface side.
Figure 3:
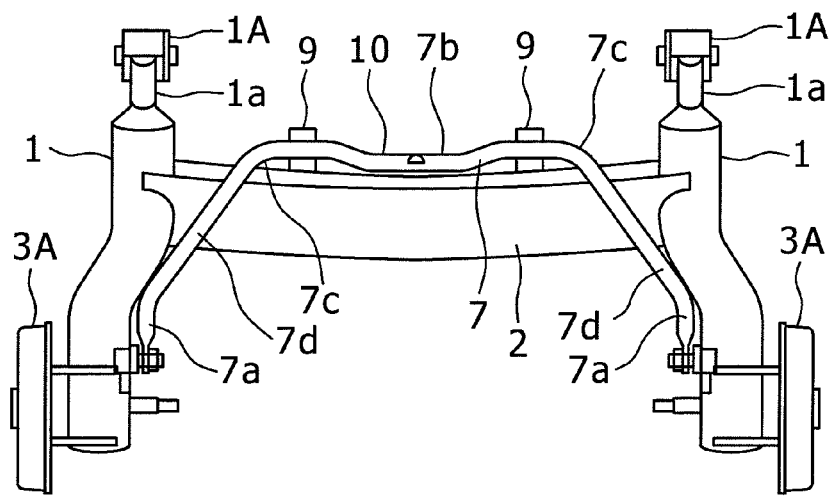
FIG. 3 is a plan view of the torsion beam and the stabilizer shown in FIG. 2, viewed from the upside.

In FIGS. 1 to 3, front-side portions of a pair of right and left trailing arms 1 extending in the vehicle longitudinal direction are connected to each other by a torsion beam 2 extending in the vehicle width direction, so that the structure thereof is formed substantially in an H shape in a plan view as a whole.

To the rear end portion of each of the trailing arms 1, a wheel supporting member 3A is fixed, and a wheel 3 is turnably supported on the wheel supporting member 3A. The torsion beam 2 connects the right and left wheels 3 to each other via the right and left training arms 1. The trailing arm 1 is swayably supported on a vehicle body 4 via a bush 1A mounted to a front end part 1a, and is supported on the vehicle body 4 via a shock absorber 5, mounted to a rear end part 1b, and a coil spring 6.

Figure 4:
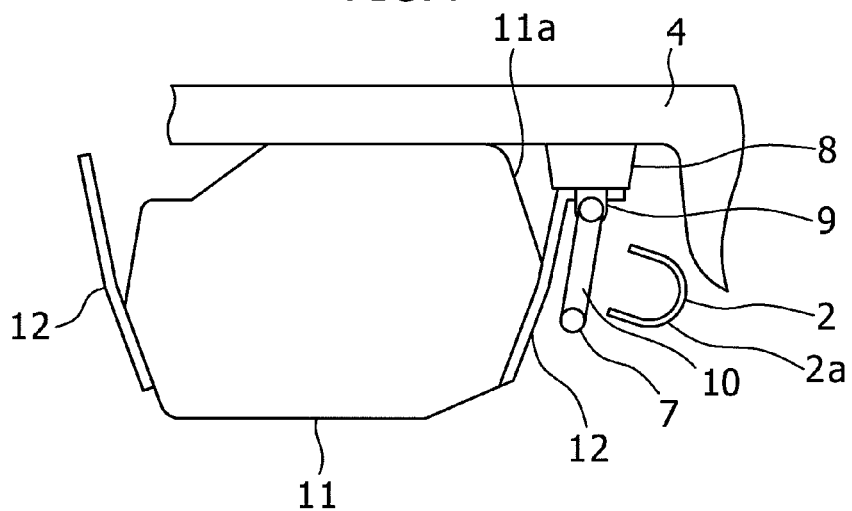
FIG. 4 is a conceptual view showing the positional relationship between a torsion beam and stabilizer and a fuel tank.

Reference numeral 7 denotes a stabilizer. For this stabilizer 7, both end parts 7a thereof are attached to the rear end parts 1b of the trailing arms 1, and an middle part 7b thereof is attached to a cross member 8 disposed in the vehicle width direction above the torsion beam 2. Both sides of the middle part 7b of the stabilizer 7 are attached to the cross member 8 via stabilizer mounting members 9. In the middle part 7b of the stabilizer 7 located between the stabilizer mounting members (vehicle body attachment parts) 9, a curved part 10 curved downward is provided. This curved part 10 is, as shown in FIG. 4, located between a front part 2a of the torsion beam 2 and a rear surface 11a of a fuel tank 11 disposed in front of the torsion beam 2.

The stabilizer 7 is provided to restrain the vehicle from rolling, and if the vehicle body attachment span is increased, the spring constant can be increased. Usually, to reduce the weight of the stabilizer 7, as the stabilizer 7, a stabilizer in which the vehicle body attachment span is large and the wire diameter is small as much as possible is adopted. Regarding the durability, portions having a high stress value are rounded parts 7c near the outer sides of the vehicle body attachment parts (stabilizer mounting members 9), and on the inside of the vehicle body attachment parts (stabilizer mounting members 9), there is no portion that may have poor durability. For this reason, the stabilizer 7 has a structure such that the inside portion of the vehicle body attachment parts, which is deemed to have little influence in terms of the performance of the stabilizer 7, is curved.

An intermediate part 7d between the middle part 7b and the end part 7a of the stabilizer 7 supported on the stabilizer mounting members 9 extends to the vehicle body rear side so that the stabilizer 7 spreads slantwise to the outside in the vehicle width direction.

In the case in which a resin-made tank is used, the fuel tank 11 is supported on the vehicle body by using a tank belt 12, and the curved part 10, which is curved downward, of the stabilizer 7 is arranged so as to face to the tank belt 12 disposed on the rear surface 11a side of the fuel tank 11.

Next, the operation of the above-described torsion beam type suspension is explained.

As shown in FIG. 4, when an excessive impact load is applied from the rear, the torsion beam 2 moves to the vehicle body front. On account of this movement, the beam body 2a of the torsion beam 2 contacts with the curved part 10, and moves while pushing the curved part 10. On account of this movement, the curved part 10 of the stabilizer 7 contacts with the fuel tank 11 via the tank belt 12.

Figure 5:
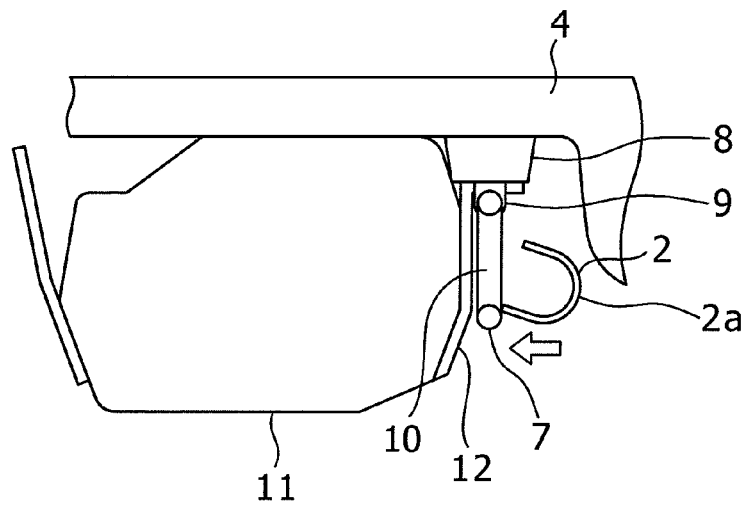
FIG. 5 is a conceptual view showing a torsion beam and a stabilizer moved by an impact load applied from the vehicle body rear.

Since the beam body 2a of the torsion beam 2 moves while pushing the curved part 10 as described above, the beam body 2a moves to the vehicle body front while the impact is absorbed. Thus, the beam body 2a of the torsion beam 2 contacts with the fuel tank via the curved part 10 and the tank belt 12 as shown in FIG. 5. Therefore, trouble in that an angular portion and the like of the beam body 2a of the torsion beam 2 contacting directly with the fuel tank 11 can be prevented.

In the above-described embodiment, the curved part 10 of the stabilizer 7 is provided in the middle part 7b of the stabilizer 7 located between the stabilizer mounting members 9. However, three curved parts including the curved part 10 can be provided by providing curved parts, which are curved downward, in the outside portions of the stabilizer mounting members 9. Thereby, even in the case in which the movement direction of the beam body 2a of the torsion beam 2 deviates to a slantwise direction, any of the curved parts can cover the front surface of the beam body 2a.

Also, in the above-described embodiment, the case in which a resin-made tank is used as the fuel tank has been explained. However, in the case in which an iron-made fuel tank is used, the fuel tank is attached to the lower surface of the vehicle body by using a bracket by utilizing a joint bead of the fuel tank. In this case as well, the curved part 10 of the stabilizer 7 contacts with the iron-made fuel tank or the bracket, so that trouble in that the beam body 2a of the torsion beam 2 directly contacts with the iron-made fuel tank or the bracket can be prevented.

Furthermore, in the above-described embodiment, the case in which the middle part 7b of the stabilizer 7 is attached to the cross member 8 disposed in the vehicle width direction above the torsion beam 2 has been explained. However, the middle part 7b of the stabilizer 7 can be attached to the floor lower surface of the vehicle body 4.

Still further, in the above-described embodiment, the case in which both the end parts 7a of the stabilizer 7 are attached to the rear end parts 1b of the trailing arms 1 has been explained. However, both the end parts 7a of the stabilizer 7 can be attached to any other locations as long as the function of the stabilizer can be performed. It is a matter of course that in addition, changes and modifications can be made as appropriate without departing from the spirit and scope of the present invention.

What is claimed is:

1. A torsion beam type suspension in which a pair of trailing arms are connected to a beam body to form an H-shaped torsion beam, and both ends of a stabilizer separate from the torsion beam are connected to the trailing arms, wherein both-side parts of the stabilizer extending along the beam body are attached to a vehicle body, a portion between vehicle body attachment parts of the stabilizer is curved downward, and the curved part is disposed at the rear of a fuel tank and in front of the beam body.

2. The torsion beam type suspension according to claim 1, wherein the vehicle body attachment parts of the stabilizer are disposed on the outside at the right and left of the center in the vehicle body width direction and on the inside of both end attachment positions of the stabilizer.

3. The torsion beam type suspension according to claim 2, wherein curved parts that curve downward are formed on the outside of the vehicle body attachment parts of the stabilizer.

4. The torsion beam type suspension according to claim 1, wherein the vehicle body attachment parts of the stabilizer are attached to a cross member of the vehicle body.

5. The torsion beam type suspension according to claim 1, wherein a member for suspending the fuel tank is provided between the fuel tank and the downward bent parts of the stabilizer.

6. The torsion beam type suspension according to claim 5, wherein the member for suspending the fuel tank is a tank belt.

7. The torsion beam type suspension according to claim 5, wherein the member for suspending the fuel tank is a tank bracket and a bead part provided on the tank.

* * * * *